April 17, 1956 P. ROBLEDANO 2,742,487
METHOD OF EXTRACTING OIL FROM MATURE, FRESH COCONUT MEATS
Filed May 2, 1952
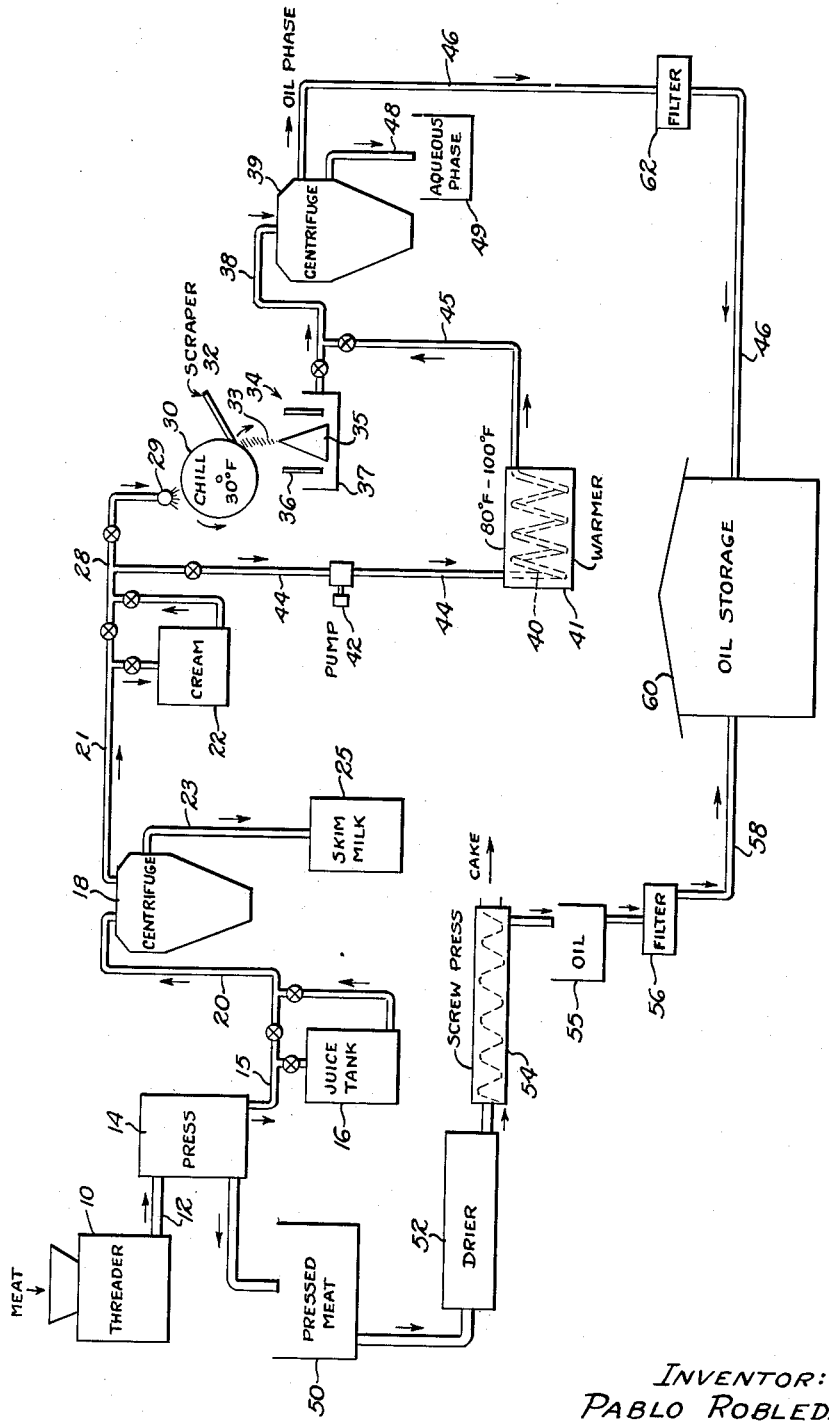
INVENTOR:
PABLO ROBLEDANO
BY HIS ATTORNEYS
HARRIS, KIECH, FOSTER & HARRIS

# United States Patent Office 2,742,487
Patented Apr. 17, 1956

2,742,487

METHOD OF EXTRACTING OIL FROM MATURE, FRESH COCONUT MEATS

Pablo Robledano, Manila, Philippine Republic, assignor to The Coconut Processes Inc., Manila, Philippine Republic, a corporation of the Philippine Republic Application May 2, 1952, Serial No. 285,683

9 Claims. (Cl. 260—412)

This invention relates principally to the extraction of coconut oil from mature, fresh coconut meat, in connection with which the process is particularly described, the invention relating also to processes for separation of vegetable oils from other nut meats, various oleaginous beans and seeds, such as peanuts and soybeans, avocados, olives, and the like. The process is also applicable to the dairy industry for the recovery of protein-free butter-fat, and to the essential oil industry, such as for recovery of lemon and orange oil from peel.

A particular object of the invention is to provide a process for the extraction of the highest quality of oil in the shortest possible time, with relatively simple and inexpensive apparatus and with limited labor, while at the same time yielding maximum oil recovery.

Another object of the invention is to provide for optimum oil recovery without the necessity for preliminary drying of the meats to be treated, as is required in the case of copra, and under conditions to take advantage of optimum benefits of enzymatic action without the development of fermentive or bacterial effects, such a process still yielding maximum oil recovery and oil of optimum quality.

Additional objects of the invention are to process coconut and similar oleaginous meats to recover their oils without the employment of added water, to avoid settling operations, and to avoid excess apparatus such as stratification tanks.

I have discovered that oils of excellent quality may be relatively inexpensively recovered from mature coconuts and other oleaginous nut meats, beans, seeds and the like by pressing the nut meats, such as coconut meat to expel a maximum quantity of the juice of the meat, separating the resultant juice by centrifuging to yield a so-called "cream" and a so-called "skim-milk," then treating the cream by either of two procedures to take advantage of optimum enzymatic effects to break natural emulsions present and any artificial emulsions which may have developed, and centrifuging the resultant enzymatically treated cream to recover an oil which is of highest quality, optimum color, and free from acidity. Preferably the coconut meat before pressing is subdivided by procedures presently to be described to avoid the production of artificial emulsions such as result from grinding or grating with discs and other grinding means, such subdividing being in the nature of cutting or shredding to produce threads or other cut, discrete portions during whose formation rubbing and grinding such as would produce artificial emulsion are avoided. The advantage in the described cream treatment is a result of my discovery that optimum enzymatic effects may be obtained in the cream without the presence of the aqueous or skim-milk phase which is removed by centrifugation. At no stage is water added from any outside source. As a consequence volume is maintained at the minimum and the over-all capacity of the apparatus is, in effect, increased over that required by prior processes.

As is well understood in the coconut industry, coconuts are selected for picking when they are known as "mature," which is a condition in which they are neither over-ripe nor under-ripe as the terms are well understood. In general this mature condition is determined by the softening of that spot in the coconut through which germination would eventually occur, no development of the haustorium having yet commenced. Preferably, for the present purpose, a short period of aging after picking is allowed. This may be from five or six days to fourteen or fifteen days. Such matured coconuts are piled or stored (without removal of their husks) for the indicated time until a condition develops which is very favorable to subsequent enzymatic action required for complete oil separation. Such storage time, or aging, if permitted, is not long enough for the development of the haustorium or germination. While not essential, such aging is desirable for maximum oil recovery, and, even if the coconut piles are sorted during the aging period to select coconuts properly aged, such sorting is economically offset by the increased oil recovery therefrom. Proper aging offers the further advantage that there is some evaporation of water from the unhusked coconuts so as to yield a higher concentration of oil in subsequent treatment, aging of proper duration at the same time avoiding excessive drying of the coconut meat, and the indicated time limit of fourteen or fifteen days avoiding such excessive drying.

When the mature or properly aged coconuts are selected and transported to the mill, their husks and shells are removed in the conventional manner, and the usual water contained in the coconut cavities separated. Following removal of the husks and shells, the coconut meats, as indicated in the accompanying flow sheet, are introduced into a threading or shredding apparatus 10 which acts to cut the meat into threads or strings without rubbing or grinding to produce artificial emulsification which would yield corresponding emulsions in addition to the naturally occurring oil emulsions in the meat. The threads or strings of coconut meat thus produced are then passed by any appropriate conveyor 12 to a conventional press or other desired press 14 which serves to expel a maximum amount of the juices from the coconut meat. The juice thus expelled amounts commonly to about 80% of the weight of the original coconut meat. Such a separation squeezes out all but a very few per cent of the original juices (which term includes the accompanying oil), and with efficient apparatus all but about 2% of the original water content and 2% of the original oil are separated.

This pressed juice may be passed, as by a line 15, into a receiving tank 16 in which it is retained for as short a time as possible and from which it is passed to a conventional centrifuge 18. If desired, the juice from the press 14 may be by-passed directly through a line 20 to the centrifuge. In either event, centrifuging should take place rather promptly after pressing, in order to avoid fermentation, that is preferably within a period of a few minutes or at most within about an hour or two, this relatively short time lapse being used to avoid substantial bacterial contamination which would result in fermentation.

The centrifuging operation yields the previously mentioned "cream" and "skim-milk." The cream is removed as through its discharge line 21 and passed if desired, to a receiving vessel 22, the skim-milk being discharged through a line 23 and passed, if desired, to a receiving tank 25. Typically, the cream, which constitutes about 50% of the total juice recovered from the coconut meat, is about 85% oil (or in the order of 40% to 45% of the total juice), the remainder of the cream being about 9% water and around 6% protein containing a little oil mechanically held in the protein. The skim-milk is principally water which contains about 2.5% protein.

Following the separation of the cream from the skim-milk, the centrifuged cream is then subjected to either of two enzymatic treatments to break the natural oil emulsion and natural oil-containing envelopes found in the cream so that the oil may be separated from the aqueous constituent. These treatments may be designated as a "chilling treatment" (which is relatively short) and a "warming treatment" (which is long as compared with the chilling treatment).

In the chilling treatment, which is the preferred treatment because it is so much shorter, the cream is chilled as quickly as possible after centrifuging to a temperature in the order to 0° C. to 10° C., preferably about 0° C., or between about 30° F. and 50° F. This is desirably accomplished by taking the centrifuged cream from the line 21 directly, or from the receiving vessel 22, by way of a valved line 28 and delivering the cream to a chilling device which solidifies it, the chilling device being represented in the flow sheet by an elongated, horizontal drum 30 whose surface is chilled to the indicated temperature. The delivery of the cream, which may be flowed onto or sprayed onto the surface of the drum, results in the application of a thin layer of the cream upon the surface of the elongated drum. This layer may be about 1/32 of an inch think, for example. As the drum rotates, the cream is solidified and at a suitable stage in its rotation the hardened cream is removed as by a scraper 32, the scrapings 33 of solidified cream dropping into a continuously operating melting device 34. The chilling drum 30 may have a rotation speed of around 60 seconds to 75 seconds or approximately 1 R. P. M. Thus, the solidified cream at the time that it is scraped from the drum may have been on the drum for something over one-half minute so that it will have become thoroughly chilled to the minimum temperature desired. Chilling may of course endure for a much longer time, or take place in other apparatus. Bacterial contamination is no problem when solidifying. At the lower temperatures, freezing of the water present forms ice crystals as well as oil crystals, all of which aid in breaking the natural emulsion and in rupturing the walls of oil-containing protein cells present in the cream.

The scrapings delivered to the melting device 34 are raised to a temperature between about 80° F. (25° C. to 27° C.) and 120° F. (50° C.). Preferably the upper limit is about 100° F. (38° C. to 40° C.). A good operating range is 85° F. to 90° F. The lower limit is such as readily to melt the solidified cream which remains solid at 75° F. The upper limit must not exceed 120° F., that is, a temperature at which the enzymes are destroyed.

The melting device 34, which may be any appropriate apparatus, is illustrated as a heated cone or wedge 35 and adjacent double wall members 36 feeding to a vessel 37. Upon melting of the solidified cream, rapid enzymatic effect occurs and promptly breaks the natural emulsion originally existing in the coconut meat. This may result within ten to twenty seconds. The enzymatic activity, which was very low in the original juices and in the centrifuged cream, and continues slowly during the chilling, is very greatly accelerated after melting, such acceleration apparently having been effected by chilling to the indicated low temperature on the drum 30 (or by other appropriate chilling apparatus or procedure). The chilling, due to contraction and other incidental effects, acts not only to break the emulsion but also to rupture protein cells or envelopes which contain oil globules, thereby releasing the oil in conjunction with the enzymatic effects. Evidence of enzymatic action is found in the noticeable evolution of gas bubbles in the melted cream.

The melted cream accumulated in the vessel 37 is passed rather promptly by a line 38 to another centrifuge 39 wherein the oil is separated and recovered and the water and protein are separated and removed. Centrifuging of the melted cream should occur soon enough after melting to avoid substantial bacteria access and bacterial action or fermentation.

Typically, the oil fraction recovered from centrifuging the chilled and melted cream from the vessel 37 may constitute as much as 88% of the cream, the resultant aqueous fraction constituting about 12% of the cream, and this aqueous fraction including about 5% water, about 5% protein, and about 2% of contained oil.

The alternative enzymatic treatment, namely the above mentioned "warming treatment," includes warming the centrifuged cream separated in the centrifuge 18, and taken from the line 28, by continuous circulation, as through a warmed pipe or coil 40, in a vessel 41, or in a closed vessel 41 itself, or similar closed warming apparatus. Here the temperature is maintained within the above indicated range of 80° F. to 100° F. However, to develop this enzymatic action requires a relatively long period of time, in the order of about six hours, for example, or within a possible range of about four hours to eight hours. This period of time does not result in fermentation because of the prior substantial exclusion of bacteria and other fermentation-producing factors. To effect this warming operation, a pump 42 in a line 44 is used to take the cream from the line 28 and pass it to the coil 40 at an appropriate rate to provide the indicated warming period, such as the six hours mentioned. From the coil 40, the warmed cream, which has been subjected to prolonged, but slow, enzymatic action, is passed by a line 45 to the centrifuge 39 via the line 38 leading also from the vessel 37.

A typical recovery of oil from the warming treatment in the coil 40 is 84% oil and 16% aqueous phase, the latter 16% being about 7% water, 5% protein, and 4% contained oil. Thus, compared with the chilling treatment, there may be a loss of about 2% of oil to be picked up by subsequent treatment, and the time element is vastly increased. However, the long warming treatment has the advantage that we avoid the chilling operation and the expense of the corresponding equipment. The oil phase from the centrifuge 39 is indicated as being recovered by the line 46 and the aqueous phase as being recovered by the line 48 and a tank 49.

In order to recover the relatively large proportion of oil in the aqueous phase from the centrifuging of the chilled and melted cream from tank 37, this aqueous phase may subsequently be passed through the previously described chilling, melting and centrifuging operation either by way of the chilled drum 30, or another chilled drum or other chilling means.

The relatively large proportion of oil in the aqueous phase from the centrifuging of the long-period warmed oil from the coil 40 may be recovered by the chilling procedure above described by which the residual oil from the other aqueous phase is recovered.

The coconut meat discharged from the press 14 following recovery of the juices therefrom normally contains an appreciable amount of residual oil. In order to recover such oil, the pressed meat is discharged from the press 14 into a collecting bin 50, and from the bin 50 this oil-containing pressed meat is passed to a drier 52 through which it is caused to travel until the water content is lowered to about 2% or 3%. The meat thus dried is then transferred to a typical screw press 54 from which the residual oil in the dried meat is readily expelled. The cake discharged from the screw press 54 is substantially dry and substantially oil-free. The object in reducing the water content in the meat passing to the drier is to avoid slippage of the screw as the meat is being treated in this operation. The residual oil thus expelled may be collected in a tank 55 from which it is passed to a filter 56. The discharge from the filter 56 is passed by a line 58 to a storage tank 60 which also receives the finished oil from the centrifuge 39 by way of the line 46 and a filter 62. The oil recovered by way of the screw press 54 may amount to as much as 3% or 4% of the original coconut meat.

If desired, a by-product may be obtained from the skim-milk in the receiving tank 25 by acidifying to a pH of 4.5 to 5 to coagulate the proteins, these being recovered by filtration. Appropriate acids for acidifying the skim-milk may be hydrochloric acid, acetic acid, and the like.

Specific advantages of the process above described are found in the very high quality oil product obtained, the shortness of time, as compared with all prior processes, and especially the shortness of time of that form here described wherein the chilling stage is employed as a means to promote enzyme activity, the avoidance of long settling periods of processes heretofore employed, and the avoidance of incidental fermentation with consequent acid formation which results from treatments employing long settling periods. Also, with the present procedures, there is no loss of oil which commonly results from the characteristic oil-containing "cuff" which forms at the interface where stratification is relied upon.

Another advantage is found in the ability of the present process to employ the enzymatic action without the necessity for permitting any fermentation to take place; in other words, by the present process enzymatic action readily occurs in the cream without the presence of the aqueous phase of the juice, namely the skim-milk described. This enzymatic effect in the cream appears to be due to the fact that lactic, acetic and butyric acids, which develop from fermentation and have an adverse effect, are avoided by reason of the avoidance of fermentation in these short-period operations. This is true both when the chilling treatment is used and when the longer-period warming treatment is used. The advantage of avoidance of acidity is due to the fact that the acidity may bring the proteins to their iso-electric point and result in their coagulation, such coagulated particles enclosing oil globules which are difficult to release and which pass off with the aqueous phase.

Another advantage of the present process employing enzymatic action to effect de-emulsification in the cream is that, during centrifuging, a quantity of sludge separates from the oil and collects on the inside of the bowl which is replaced from time to time. This removal and retention of the sludge are of much importance because this sludge has an ability to absorb about 150% of its own weight in water. In the case of gravity separation, the sludge remains in the cream along with the indicated absorbed volume of water, thereby increasing the cream volume and making it additionally difficult to remove the water by gravity. Such water increase lowers the oil concentration, increases the danger of secondary fermentation (due to water presence) and, especially by reason of the secondary fermentation, injures the quality of the oil product.

It will be appreciated that the rapidity of enzymatic action is a function of the temperature of the cream at the time of centrifugation, and that under the conditions herein described there is no fermentation, the enzymes, however, acting on the proteins to destroy the colloidal condition in the cream and release the oil. To get a white oil and at the same time a rapid rate of separation the temperature may be within the upper portion of the indicated range of 80° F. to 100° F. While a greater rate of separation, due to increased enzymatic action, may be accomplished by the upper portion of the indicated overall range approaching 120° C., the desired highest quality white oil may not result. Similarly, if operating around 80° F., the desired highest quality of white oil will be attained but the rate of separation will be lowered.

In general, typical or average recoveries of oil from the oil-containing juice is in the order of 85%. From the standpoint of the original, fresh, mature coconut meat, typical separations, including the recovery of the residual oil in the pressed meat, amount to around 32% to about 35%. The water content of the original meat is usually about 50%, and the fiber and proteins (including the oil-free dry cake) account for the remaining 15% to 18%.

With the present process, I may also obtain a protein-free and water-free butter oil from whole cow's milk and similar milk, as well as essential oils from fresh materials such as lemon and orange peel, and perfumery oils from fresh materials such as fresh rose petals. The temperatures employed for butter oil are substantially those for treating coconut juice, cream and oil as above described. In any case, when chilling, the temperature is lowered at least to the solidification point of the oil, and for the enzymatic action temperatures are used at which the cream or equivalent is liquid and enzymatic action is adequately rapid, but below that at which the enzymes are rendered inactive or are destroyed.

In the case of butter oil preparation, the usual churning step is avoided. Also, pure butter oil in closed containers may be shipped without refrigeration and without ready rancidity development. The milk proteins are recovered dry, as in the form of typical "skim-milk powder." Typical dairy butter may then be produced by combining the protein with the butter oil in desired proportion, such as the usual approximate 10%, or even more. For example the protein may be combined with water, such as a normal proportion, or even less, and the water, protein and butter oil combined, as by homogenizing if desired, to make a high grade dairy butter or cow's butter. In the case of essential oils and the like, drying of the source material, distillation thereof, solvent extraction and the like are avoided, and the oil product has the purity and constitution of the oil in the original material. As above indicated, chilling temperatures are to be at least as low as those at which the respective oils solidify.

It is intended to cover all such aspects of the invention as fall within the scope of the patent claims.

I claim as my invention:

1. A method for the recovery of oils from coconut meats, including: pressing the meats to expel oily and aqueous constituents thereof as a liquid and centrifuging such liquid before fermentation to yield non-fermented cream and aqueous skim-milk; subjecting the centrifuged cream without prior fermentation to a temperature to freeze the aqueous fraction, produce ice crystals, and break the oil-containing cells of the emulsion; liquefying the frozen product by raising the temperature thereof to above about 80° F. while continuously retaining the temperature below 120° F.; and centrifuging the melted product while within such temperature range to separate a neutral oil phase from the aqueous phase.

2. A method as in claim 1 wherein said melting of the frozen product takes place above about 85° F. and the temperature is never permitted to exceed materially 100° F.

3. A method for the recovery of oils from coconut meats, including: pressing the meats to expel oily and aqueous constituents thereof as a liquid and centrifuging such liquid before fermentation to yield non-fermented cream and aqueous skim-milk; subjecting the centrifuged cream without fermentation to temperatures between about 80° F. and 120° F. for a time of from about four to about six hours for breaking of the walls of the cells of the cream emulsion; and centrifuging the treated liquid cream within said temperature limit to separate a neutral oil phase from a resultant aqueous phase.

4. A method as in claim 3 wherein the temperature to which the cream is subjected lies between about 85° F. and 100° F.

5. A method for the recovery of oils from coconut meats, including: pressing the meats to expel oily and aqueous constituents thereof as a liquid and centrifuging such liquid before fermentation to yield non-fermented cream and aqueous skim-milk; subjecting the centrifuged cream without fermentation to temperatures about 80° F. and below 120° F. for a period of time sufficient to weaken and break the walls of the cells of the cream emulsion but not exceeding about eight hours; and centrifuging the treated liquid cream within such upper temperature limit to separate a neutral oil phase from an aqueous phase.

6. A method as in claim 5 wherein the coconut meats prior to pressing are subdivided by a cutting procedure avoiding artificial emulsification of the oil.

7. A method as in claim 5 wherein the treating temperature of said liquid cream lies between about 85° F. and about 100° F.

8. A method for recovering coconut oil substantially free from protein including: centrifuging an aqueous protein-containing coconut oil emulsion to recover a cream phase and an aqueous phase; subjecting the centrifuged cream without fermentation to temperatures between about 80° F. and not exceeding 120° F. for a time less than eight hours to break the proteinaceous cell walls of the emulsion; and recovering from the cream so treated within said temperature limit a neutral oil phase apart from a resultant water phase.

9. A method as in claim 8 wherein the originally centrifuged cream is chilled to the freezing point of water therein to facilitate the breaking of said cell walls, and the frozen cream is then melted within a range not materially exceeding 100° F.

References Cited in the file of this patent
UNITED STATES PATENTS

| | | |
|---|---|---|
| 1,328,278 | Gavin | Jan. 20, 1920 |
| 1,366,339 | Alexander | Jan. 25, 1921 |
| 1,407,930 | Cookson | Feb. 28, 1922 |
| 2,101,371 | Lava | Dec. 7, 1937 |
| 2,397,874 | Lloyd | Apr. 2, 1946 |
| 2,486,384 | Beckman | Nov. 1, 1949 |
| 2,486,385 | Beckman | Nov. 1, 1949 |